United States Patent
Ohara et al.

(10) Patent No.: US 10,630,360 B2
(45) Date of Patent: Apr. 21, 2020

(54) COMMUNICATION DEVICE AND COMMUNICATION METHOD

(71) Applicant: NTT DOCOMO, INC., Tokyo (JP)

(72) Inventors: Tomoya Ohara, Tokyo (JP); Hiroki Harada, Tokyo (JP); Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/335,777

(22) PCT Filed: Sep. 13, 2017

(86) PCT No.: PCT/JP2017/033085
§ 371 (c)(1),
(2) Date: Mar. 22, 2019

(87) PCT Pub. No.: WO2018/061777
PCT Pub. Date: Apr. 5, 2018

(65) Prior Publication Data
US 2019/0245599 A1      Aug. 8, 2019

(30) Foreign Application Priority Data

Sep. 29, 2016   (JP) .................................. 2016-192356

(51) Int. Cl.
*H04B 7/06*      (2006.01)
*H04W 16/28*     (2009.01)
(Continued)

(52) U.S. Cl.
CPC .......... *H04B 7/0617* (2013.01); *H04B 7/0456* (2013.01); *H04B 7/06* (2013.01);
(Continued)

(58) Field of Classification Search
CPC .. H04B 7/0617; H04B 7/0626; H04B 7/0632; H04B 7/0854; H04B 7/0665;
(Continued)

(56) References Cited

U.S. PATENT DOCUMENTS

2016/0065388 A1*   3/2016   Kakishima ........... H04B 17/391

OTHER PUBLICATIONS

International Search Report issued for PCT/JP2017/033085, dated Dec. 5, 2017 (4 pages).
(Continued)

*Primary Examiner* — Rahel Guarino
(74) *Attorney, Agent, or Firm* — Osha Liang LLP

(57) ABSTRACT

Provided is a communication device. The communication device communicating with another communication device, includes: a reception unit configured to receive a signal transmitted from the another communication device; a transmission unit configured to transmit a signal to the another communication device; and a control unit configured to determine a weighting vector to be used in the reception unit and a precoding vector to be used in the transmission unit, in which, in a case where a specific reference signal indicating that the weighting vector used for receiving the signal in the another communication device has been changed is received by the reception unit, the control unit determines the precoding vector to be used for signal transmission by performing channel estimation by using the received specific reference signal, and in which the transmission unit transmits data precoded with the precoding vector determined by the control unit.

12 Claims, 9 Drawing Sheets

(51) Int. Cl.
 *H04W 28/18* (2009.01)
 *H04B 7/0456* (2017.01)
 *H04B 7/08* (2006.01)

(52) U.S. Cl.
 CPC .......... *H04B 7/0626* (2013.01); *H04W 16/28* (2013.01); *H04W 28/18* (2013.01); *H04B 7/0842* (2013.01)

(58) Field of Classification Search
 CPC . H04L 5/0023; H04L 27/2613; H04L 5/0048; H04L 2025/03426; H04L 25/0202; H04L 25/0224; H04W 16/28; H04W 72/04; Y02D 70/1262
 See application file for complete search history.

(56) References Cited

OTHER PUBLICATIONS

Written Opinion issued for PCT/JP2017/033085, dated Dec. 5, 2017 (3 pages).
Anass Benjebbour et al.; NTT DOCOMO Corporation, NTT DOCOMO Technical Journal "5G Radio Access Technology"; Jan. 2016 (25 pages).
NTT DOCOMO, Inc.; "Beam management with reciprocity based beam determination considering interference"; 3GPP TSG-RAN WG1 Meeting #87 R1-1612733; Reno, USA, Nov. 14-18, 2016 (5 pages).

* cited by examiner

COMMUNICATION DEVICE AND COMMUNICATION METHOD

TECHNICAL FIELD

The present invention relates to a communication device and a communication method.

BACKGROUND ART

In long term evolution (LTE), in order to further increase system capacity, further increase a data transmission speed, and realize further low latency in a radio section, a wireless communication scheme called 5G has been discussed. In 5G, in order to satisfy the requirement that the latency of the radio section be 1 ms or less while achieving a throughput of 10 Gbps or more, various wireless techniques have been discussed. In 5G, a radio technology different from the LTE is likely to be adopted. Therefore, in 3rd generation partnership project (3GPP), a radio network supporting 5G is referred to as a new radio network (new radio access network (New RAT), which is distinguished from the radio network supporting the LTE.

In 5G, it is assumed that a wide frequency ranging from a low frequency band like the LTE to a frequency band higher than the LTE is used. Particularly, since the propagation loss increases in the high frequency band, applying beam-forming with a narrow beam width has been discussed in order to compensate for the propagation loss.

CITATION LIST

Non-Patent Document Non-Patent Document 1:
NTT Docomo Corporation, NTT DOCOMO
Technical Journal "5G Radio Access Technology",
January 2016

SUMMARY OF THE INVENTION

Problem to be Solved by the Invention

In the case of transmitting a signal by using the beam-forming, it is generally considered that the base station or the user apparatus (user equipment) determines the direction of the transmission beam (Tx-beam) by performing beam sweeping or the like so that the reception quality in the communication counterparty becomes good. Similarly, in the case of receiving a signal by using the beam-forming, it is generally considered that the base station or the user apparatus determines the direction of the reception beam (Rx-beam) so that the reception quality from the communication counterparty becomes good.

Herein, it is assumed that it is desirable for the base station to change the beam selection criterion between the transmission beam and the reception beam according to the communication status. For example, in a case where the interference wave observed in the base station side increases, it is assumed that it is desirable that the base station directs the transmission beam toward the direction so that the reception quality in the user apparatus side becomes good and directs the reception beam toward the direction so that the reception power of a desired wave is increased while reducing the influence of the interference wave observed by itself. In this case, it is preferable that the base station instructs the user apparatus to transmit the signal with the optimum transmission beam corresponding to the changed reception beam. As a method of performing the instruction, for example, a method is considered where the base station determines a precoding matrix indicator (PMI) according to the changed reception beam by measuring the reference signal transmitted from the user apparatus and provides the instruction of the determined PMI to the user apparatus. However, this method has a problem in that the overhead of the signaling signal transmitted and received between the user apparatus and the base station is increased. In addition, in the method using the PMI, since only predefined precoding vector can be used, there is a problem in that the granularity in the beam direction that can be indicated is rough (coarse).

In addition, as another method, a method is considered where a reference signal is transmitted from the base station with the changed reception beam by using a technique (reciprocity based transmission) of transmitting a radio signal by using a reversibility of a radio propagation path (channel), so that the direction of the transmission beam used for the UL transmission is determined in the user apparatus side.

However, in the current LTE, downlink reference signals that can be transmitted with the transmission beam of the base station are specified, but reference signals that can be transmitted by the reception beam are not specified. For example, as illustrated in FIG. 1(a), in a case where the base station directs the reception beam (Rx-beam) in a direction different from the direction of the transmission beam (Tx-beam), if the user apparatus determines the direction of the transmission beam by using the downlink reference signal transmitted with the transmission beam, the determined direction of the transmission beam becomes a direction corresponding to the transmission beam of the base station, which is not appropriate.

In addition, the above problem also occurs in a case where it is desirable for the user apparatus to change the beam selection criterion between the transmission beam and the reception beam according to the communication status. FIG. 1(b) illustrates a case where the same problem occurs in the case of transmitting DL data.

The disclosed technology is made in consideration of the above-described problems, and an object of the present invention to provide a technology capable of performing appropriate communication in a communication device that performs communication by using a transmission beam and a reception beam, even in a case where the reception beam is changed by a communication device on the reception side.

Means for Solving the Problem

A communication device according to the disclosed technique is a communication device communicating with another communication device, including: a reception unit configured to receive a signal transmitted from the another communication device; a transmission unit configured to transmit a signal to the another communication device; and a control unit configured to determine a weighting vector to be used in the reception unit and a precoding vector to be used in the transmission unit, in which, in a case where a specific reference signal indicating that the weighting vector used for receiving the signal in the another communication device has been changed is received by the reception unit, the control unit determines the preceding vector to be used for signal transmission by performing channel estimation by using the received specific reference signal, and in which the transmission unit transmits data precoded with the precoding vector determined by the control unit.

Effect of the Invention

According to the disclosed technique, there is provided a technique in a communication device performing communication by using a transmission beam and a reception beam, the technique capable of appropriately performing communication even in a case where the reception beam has been changed in the communication device on a reception side.

MODE(S) FOR CARRYING OUT THE INVENTION

Hereinafter, embodiments of the present invention will be described with reference to the drawings. The embodiments described hereinafter are merely exemplary ones, and the embodiments to which the present invention is applied are not limited to the following embodiments. For example, although it is assumed that the wireless communication system according to the embodiment is a system based on the LTE, the present invention is not limited to the LTE, but the present invention can be applied to other systems. In the specification and the claims, the term "LTE" is used in a broad sense including not only to the communication scheme corresponding to 3GPP Release 8 or 9 but also to the fifth generation communication scheme corresponding to 3GPP Release 10, 11, 12, 13, 14 or later.

<System Configuration>

Figure 1:
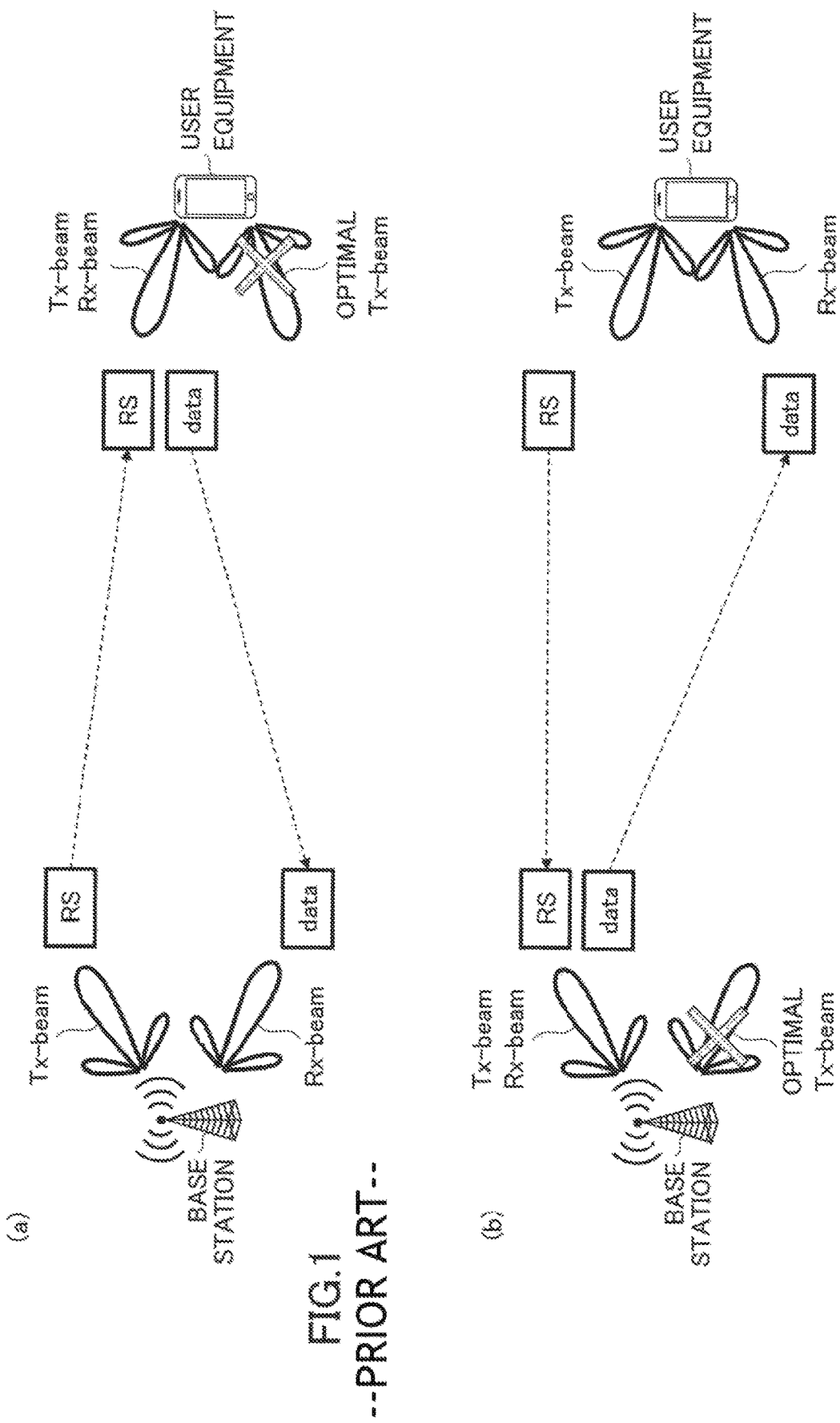
FIG. 1 is a diagram for describing a problem.
Figure 2:
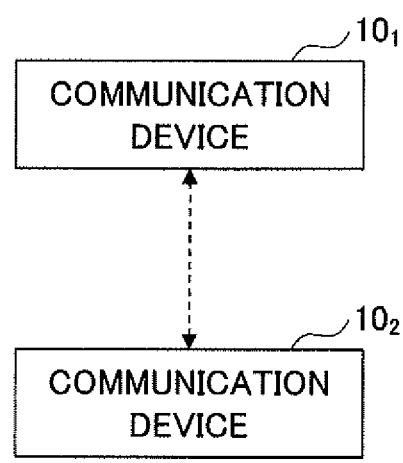
FIG. 2 is a diagram illustrating a configuration example of a wireless communication system according to an embodiment.

FIG. 2 is a diagram illustrating a configuration example of a wireless communication system according to the embodiment. The wireless communication system is configured to include a communication device $10_1$ and a communication device $10_2$. The communication device $10_1$ and the communication device $10_2$ can communicate with each other in a wireless manner. In the following description, the communication device $10_1$ and the communication device $10_2$ are described as "communication device 10" in a case where the communication devices are not to be distinguished.

Each of the communication device $10_1$ and the communication device $10_2$ is configured to include a plurality of antennas and has a function of performing beam-forming. The communication device $10_1$ and the communication device $10_2$ are, for example, base stations or user apparatuses (UEs). Unless otherwise specified, the embodiment can be applied to any one of a case where the communication device $10_1$ is a base station and the communication device $10_2$ is a user apparatus and a case where the communication device $10_2$ is a base station and the communication device $10_1$ is a user apparatus. In addition, in the embodiment, both the communication device $10_1$ and the communication device $10_2$ may be user apparatuses. The LTE standard specifies device to device (D2D) communication for allowing user apparatuses to directly communicate with each other without a base station, and the embodiment can also be applied to the D2D communication (side link (SL)).

Although it is preferable that the communication device $10_1$ and the communication device $10_2$ perform communication using a time division duplex (TDD) scheme where uplink and downlink propagation characteristics are the same, the embodiment may be applied to the case of performing communication using a frequency division duplex (FDD) scheme. This is because, even in the FDD scheme such as a case where a frequency applied to the uplink and a frequency applied to the downlink are close to each other, the uplink and the downlink propagation characteristics are substantially the same.

In the following description, transmitting a signal using a transmission beam is synonymous with transmitting a signal multiplied by a precoding vector (precoded with a precoding vector). Similarly, receiving a signal using a reception beam is synonymous with multiplying a received signal by a predetermined weighting vector. In addition, transmitting a signal using a transmission beam may be expressed as transmitting a signal with a specific antenna port. Similarly, receiving a signal using a reception beam may be expressed as receiving a signal with a particular antenna port. In addition, an antenna port denotes a logical antenna port defined by the 3GPP standard.

<Overview>

It is assumed that the communication device $10_1$ and the communication device $10_2$ form a transmission beam and a reception beam, respectively, and perform communication by beam-forming. In this state, it is assumed that the communication device $10_1$ has changed the direction of the reception beam by a certain trigger. First, in order to allow the communication device $10_2$ to transmit a signal with an optimum transmission beam corresponding to the changed reception beam, the communication device $10_1$ transmits a specific reference signal indicating that the reception beam has been changed (indicating that the weighting vector used for receiving a signal has been changed). Herein, the specific reference signal is a reference signal transmitted with the reception beam with which the communication device $10_1$ receives the signal (precoded with the precoding vector used by the communication device $10_1$ to receive the signal)

Subsequently, when the communication device $10_2$ receives the specific reference signal, the communication device $10_2$ determines the transmission beam (precoding vector) by using the specific reference signal and transmits data with the determined transmission beam (transmits data with the determined precoding vector). More specifically, the communication device $10_2$ calculates a weighting vector optimized for reception of the specific reference signal on the basis of a channel estimation result estimated by using the specific reference signal transmitted from the communication device $10_1$ by using the reversibility of a radio propagation path (channel) and transmits data precoded with the same weighting vector as the calculated weighting vector. Such a transmission method is referred to as "reciprocity based transmission".

In addition, in the following description, a specific reference signal is referred to as an RRS (reference signal for reciprocity based transmission) for the sake of convenience. The RRS is a name named for the sake of describing the embodiment, and it is intended not to exclude an RS (for example, CSI-RS or the like) specified to be used for the purposes other than reciprocity based transmission. In addition, in a case where it is simply described as a "reference signal" or an "RS", the signal is intended to mean a reference signal other than the RRS.

<Processing Procedure>

Figure 3:
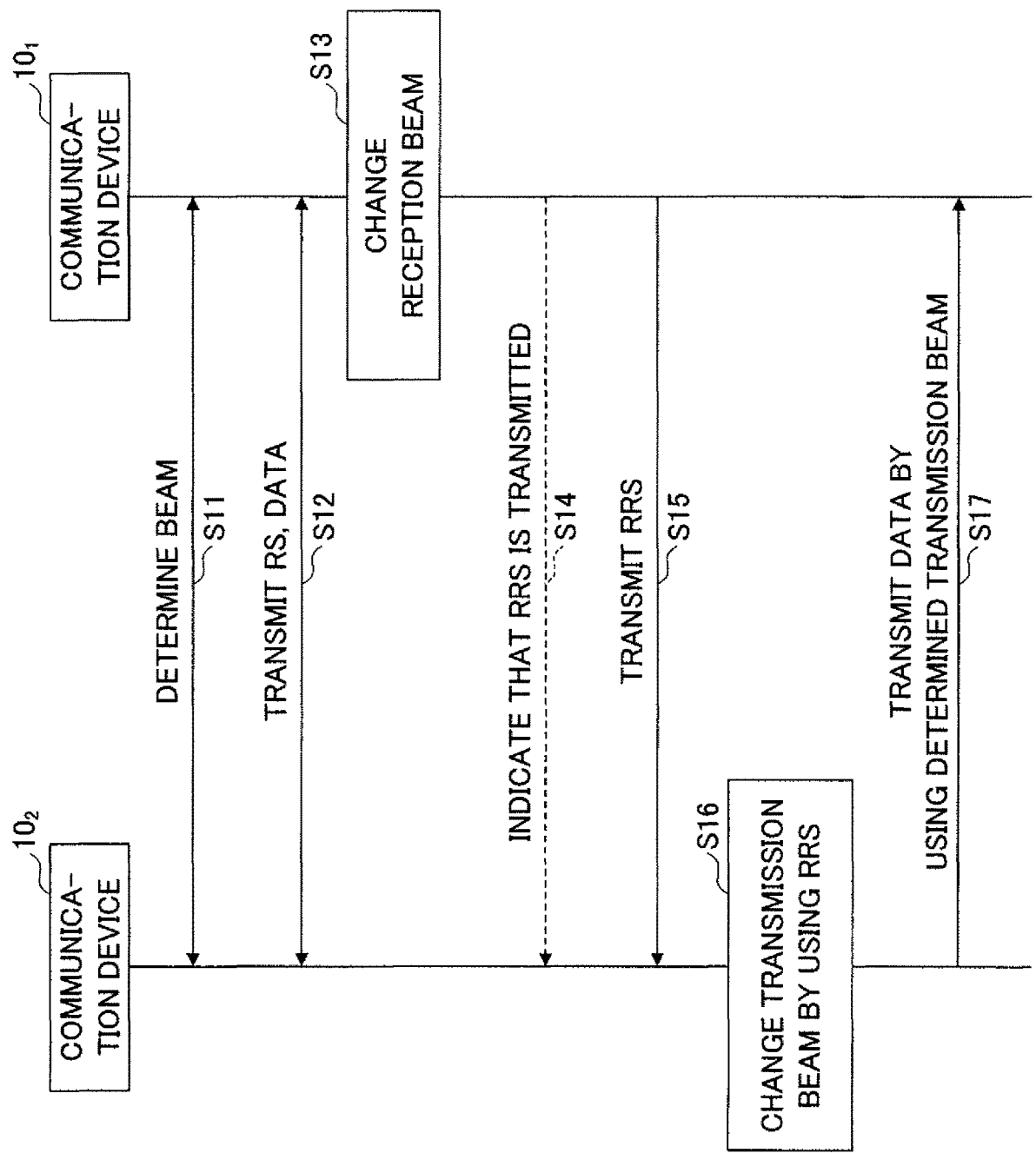
FIG. 3 is a sequence diagram illustrating an example of a processing procedure performed by a wireless communication system according to the embodiment.

FIG. 3 is a sequence diagram illustrating an example of a processing procedure performed by the wireless communication system according to the embodiment. In the following description, it is assumed that the communication device $10_1$ is a base station and the communication device 102 is a user apparatus. However, the processing sequence may be applied to a case where the communication device $10_1$ is a user apparatus and the communication device $10_2$ is a base Station and a case where the communication device $10_1$ and the communication device $10_2$ are user apparatuses (that is, in a case where D2D communication is performed).

In step S11, the communication device $10_1$ and the communication device $10_2$ determine the transmission beam and the reception beam, respectively. For example, the communication device $10_1$ and the communication device $10_2$ may determine the transmission beam and the reception beam by any method. For example, the communication device $10_1$ and the communication device $10_2$ may determine the transmission beam and the reception beam so that the reception quality (SNR/SINR) becomes good by performing beam sweeping on the basis of the "reference signals for respective beam candidates" transmitted from the counterparties.

Figure 4:
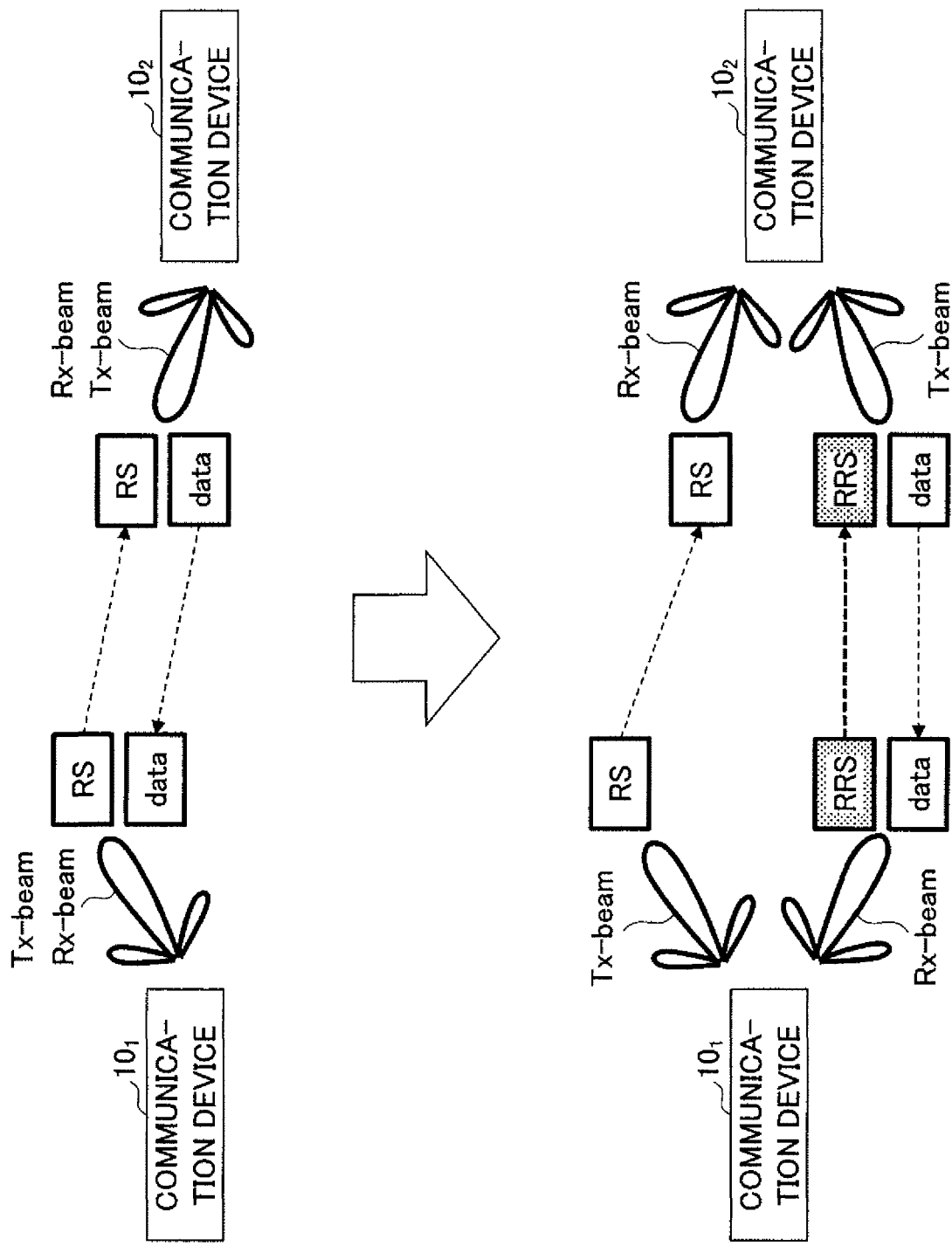
FIG. 4 is a diagram illustrating an operation example of the wireless communication system according to the embodiment.

In step S12, the communication device $10_1$ and the communication device $10_2$ perform data transmission and/or reference signal transmission by using the transmission beam and the reception beam determined in step S11. The state that the communication device $10_1$ performs reference signal transmission with the transmission beam, and the communication device $10_2$ performs reference signal reception with the reception beam and the state that the communication device $10_2$ performs data transmission with the transmission beam and the communication device $10_1$ performs data reception with the reception beam are illustrated in the upper portion of FIG. 4. In the example of the upper portion of FIG. 4, it is illustrated that the directions of the transmission beam and the reception beam of the communication device $10_1$ are the same and the directions of the transmission beam and the reception beam of the communication device $10_2$ are also the same. However, the state is merely an example, but not necessarily limited thereto.

The reference signal transmitted in step S12 may be any reference signal. For example, the reference signal may be a CST-RS (Channel State Information-Reference signal) or a BRS (Beamformed Reference signal) or may be a CRS (Cell Specific reference signal).

In step S13, the communication device $10_1$ changes the reception beam on the basis of a predetermined selection logic. The predetermined selection logic may be any logic. For example, the reception beam may be changed so that an interference wave power is decreased.

In step S14, the communication device $10_1$ indicates to the communication device $10_2$ that RRS is to be transmitted. In the case of receiving the indication, the communication device $10_2$ receives the RRS transmitted in the processing procedure of step S15 and performs the processing procedure described in step S16. On the other hand, in a case where the indication is not received, the communication device $10_2$ operates so as not to receive the RRS or operates so as not to use the determination of the transmission beam even in a case where the RRS is received. The indication may be a control signal (for example, downlink control channel (DCI)) used in the physical layer, may be a radio resource control (RRC) message, or may be broadcast information. The processing procedure of step S14 may be omitted. In a case where the processing procedure of step S14 is omitted, the communication device $10_2$ may detect by blind whether or not the RRS is transmitted. For example, the communication device $10_2$ can detect whether or not the RRS is transmitted by determining whether the received signal includes a signal sequence used in the RRS.

In step S15, the communication device $10_1$ transmits a reference signal (RRS) precoded with the precoding vector corresponding to the changed reception beam. The state that the communication device $10_1$ transmits the RRS with the changed reception beam is illustrated in the lower portion of FIG. 4.

In step S16, when the communication device $10_2$ has received the RRS, the communication device $10_2$ determines a transmission beam to be used for data transmission by performing channel estimation by using the received RRS (in other words, determines a precoding vector to be used for data transmission). For example, the communication device $10_2$ may perform the channel estimation for each of a plurality of antennas of the communication device $10_2$ by using the RRS received at each antenna and determines the precoding vector by using algorithm such as a minimum mean square error (MMSE) method or a maximum likelihood detection (MLD) method so that the reception quality of the RRS becomes good (more specifically, for example, the reception strength, the SNR, or the SINR is increased).

In step S17, the communication device $10_2$ transmits data precoded with the precoding vector determined in step S16. The communication device $10_1$ receives the data transmitted from the communication device $10_2$ and performs processing such as demodulation and decoding. The state that the communication device $10_2$ transmits the precoded data is illustrated in the lower portion of FIG. 4.

(RRS)

With respect to the RSS, a signal sequence different from the signal sequences of other reference signals used in the wireless communication system may be used.

Figure 5:
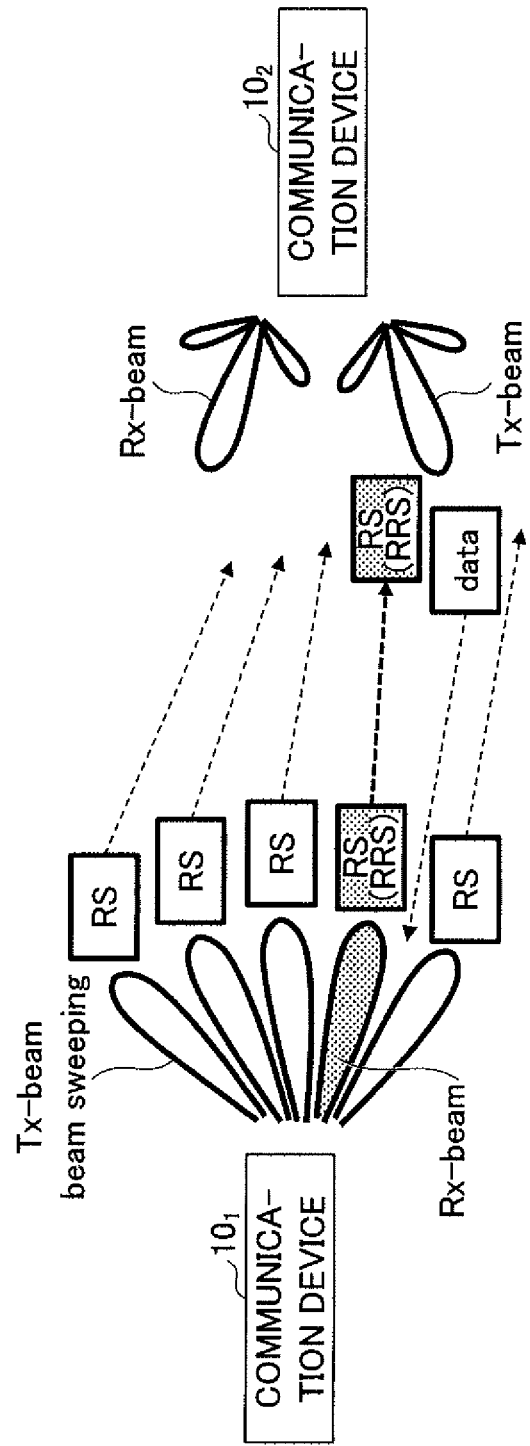
FIG. 5 is a diagram illustrating an operation example of the wireless communication system according to the embodiment.

The RRS may be a portion of a reference signal used for beam sweeping of the transmitted beam. Specifically, as illustrated in FIG. 5, the communication device $10_1$ may transmit the reference signal with each of a plurality of the transmission beam candidates in step S15 of FIG. 3 and may transmit, to the communication device $10_2$, in advance information indicating which reference signal among these reference signals corresponds to the RRS. More specifically, the information indicating which reference signal corresponds to the RRS is information (for example, index values indicating frequency resources, time resources, reference signals corresponding to the RRS, or the like) specifically or implicitly indicating a position of the radio resource with which the reference signal corresponding to the RRS is transmitted. The information indicating which reference signal corresponds to the RRS may be transmitted by using a control signal (for example, DCI) used in the physical layer, may be transmitted by using an RRC message, or may be transmitted by using broadcast information.

In addition, the information indicating which reference signal corresponds to the RRS may be referred to as information indicating a reference signal to be used for calculating the precoding vector at the time of data transmission.

The reference signal used for the beam sweeping may be a precoded CST-RS or a precoded BRS. In addition, the reference signal used for the beam sweeping may be the same as the reference signal used at the time of the beam determination in step S11 of FIG. 3.

(Radio Resource to which RRS is Mapped)

In 5G, the use of a radio frame configuration that can flexibly change areas to which various physical channels are mapped within a unit resource has been discussed. In addition, facilitating flexibly changing downlink and uplink within a unit resource has also been discussed. In the embodiment, the radio resource to which the RRS is mapped may be time-multiplexed or frequency-multiplexed with other reference signals. In addition, the RRS may be spatially-multiplexed or code-multiplexed with other reference signals. The position of the radio resource to which the RRS is mapped may be indicated in advance to the communication device 10 that receives the RRS from the communication device 10 that transmits the RRS or may be specified in advance by standard specifications or the like.

Figure 6:
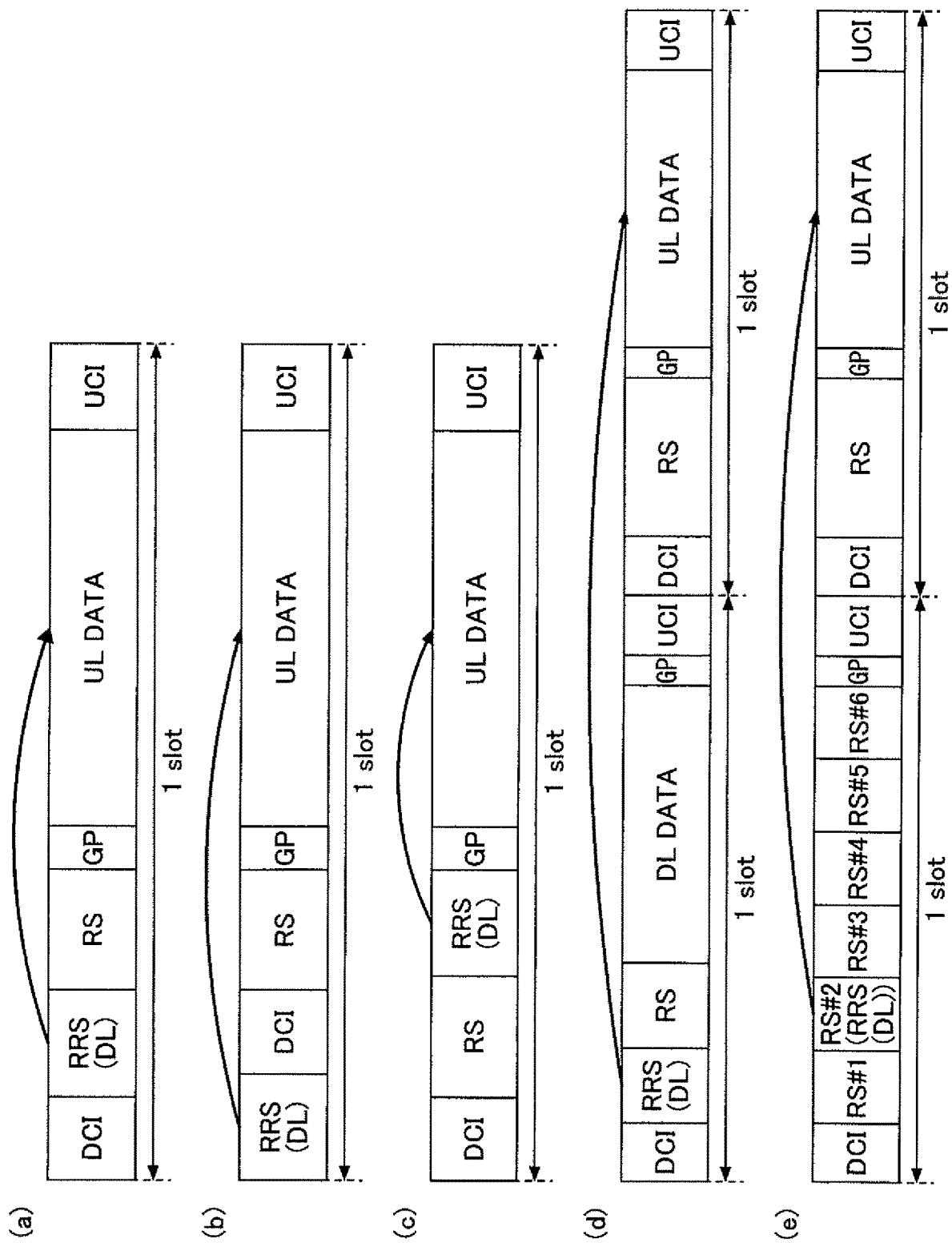
FIG. 6 is a diagram illustrating examples of positions of a radio resource to which RRS (DL) is mapped.

FIG. 6 illustrates an example of the radio resource positions to which the RRS to be transmitted on the downlink is mapped. In FIG. 6, "DCI" indicates a control signal to be transmitted on the downlink. The "RRS (DL)" indicates an RRS to be transmitted on the downlink. The "RS" indicates a reference signal other than the RRS to be transmitted on the downlink. A GP is a gap period which is a period set for the purpose of preventing a downlink signal and an uplink signal from interfering with each other at the time of switching from the downlink to the uplink. "UL DATA" indicates uplink data (for example, user data). "Uplink control information (UCI)" indicates a control signal to be transmitted on the uplink. FIG. 6 is a drawing illustrated by assuming that the unit resource is one slot. However, it is merely an example, and the unit resource may also be replaced with a different unit resource (for example, one subframe, one transmission time interval (TTI), or one mini-slot). The mini-slot is a unit resource for realizing scheduling with the number of symbols smaller than the number of symbols in one slot and has been discussed in 5G.

FIGS. 6(a), 6(b), and 6(c) illustrate specific examples where the RRSs and the uplink data corresponding to the RRSs are mapped to the same unit resource. The example in FIG. 6(b) is appropriate for a case where it is desired to secure a certain amount of time from reception of the RRS to transmission of the uplink data in the communication device 10. The example of FIG. 6(c) is very appropriate for a case where it is desired to suppress the influence of a fluctuation of the channel characteristic which may occur from the reception of the RRS to the transmission of the uplink data.

FIGS. 6(d) and 6(e) illustrate specific examples where the RRSs and the uplink data corresponding to the RRSs are mapped to a plurality of the unit resources. In the example of FIGS. 6(d) and 6(e), the uplink data corresponding to the RRS is mapped to a slot next to the slot to which the RRS is mapped. However, the uplink data corresponding to the RRS may be mapped to a slot two or more slots after the slot to which the RRS is mapped.

In addition, FIG. 6(e) illustrates a specific example in a case where the RRS is a portion of the reference signal used for beam sweeping for the transmission beam as described in "(RRS)". FIG. 6(e) illustrates an example in a case where RS #2 is in correspondence with the RRS among six reference signals (RS #1 to RS #6) used for the beam sweeping. As described above, the six reference signals (RS #1 to RS #6) may be CSI-RSs or ERSs.

Figure 7:
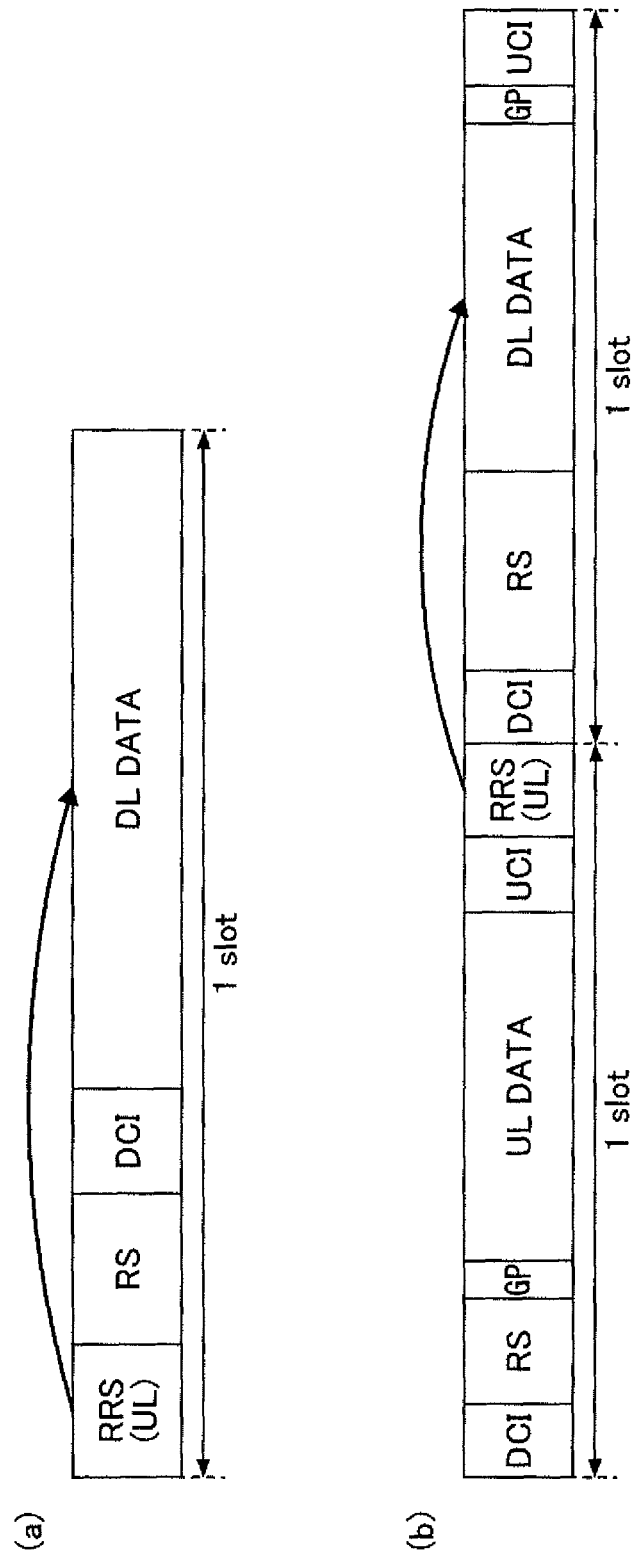
FIG. 7 is a diagram illustrating examples of positions of a radio resource to which RRS (UL) is mapped.

FIG. 7 illustrates examples of positions of the radio resource to which the RRS transmitted on the uplink is mapped. In FIG. 7, "RRS (UL)" indicates the RRS to be transmitted on the uplink. FIG. 7(a) illustrates a specific example where the RRSs and the downlink data corresponding to the RRSs are mapped to the same unit resource. FIG. 7(a) is merely an example, and for example, the positions of the RS and the RRS (UL) may be reversed. FIG. 7(b) illustrates a specific example where the RRSs and the downlink data corresponding to the RRSs are mapped to a plurality of the unit resources. For example, the positions of the UCI and the RRS (UL) may be reversed, or the RRS (UL) may be mapped to a position before (or after) the DCI or RS of the first half slot.

In a case where the embodiment is applied to the D2D communication, instead of the areas of "UL DATA" and "UCI" in FIGS. 6 and 7, "RRS (SL)" and "SL DATA" are mapped.

(Blind Detection of RRS)

Figure 8:
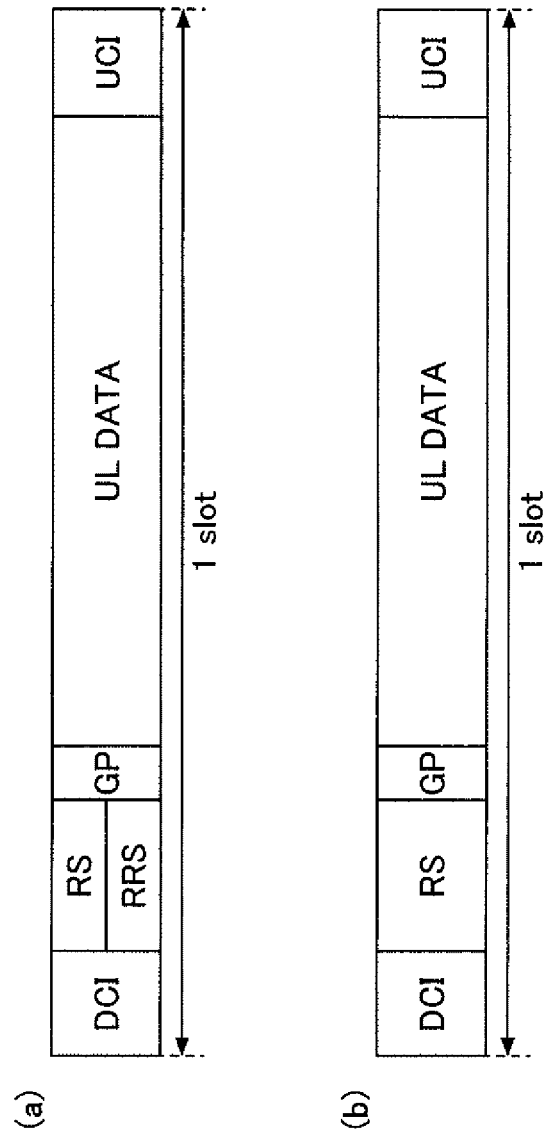
FIG. 8 is a diagram for describing a blind detection operation of an RRS.

As described in step S14 of FIG. 3, the communication device $10_2$ may detect by blind whether or not the RRS is transmitted. In this case, in a case where the communication device $10_1$ does not transmit the RRS, another reference signal may be mapped to the radio resource to which the RRS is to be mapped. An example in a case where the RRS is transmitted is illustrated in FIG. 8(a), and an example in a case where the RRS is not transmitted is illustrated in FIG. 8(b). Therefore, the communication device $10_2$ can detect by blind whether the received reference signal is an RRS or another reference signal other than RRS on the basis of the sequence of the received reference signal or the like.

(Correspondence Between RRS and UL Grant)

In the embodiment, information (UL grant information) indicating the transmission method of the uplink data is in correspondence with the time resource, the frequency resource, and/or the signal sequence to which the RRS is mapped in advance, and the communication device $10_1$ (base Station) may implicitly indicate, to the communication device $10_2$ (User Apparatus), the UL grant information by transmitting the RRS. In other words, when the communication device $10_2$ performs data transmission in step S17 of FIG. 3, the communication device $10_2$ (User Apparatus) may perform the data transmission according to the UL grant information which is in correspondence with the received time resource of RRS or the like.

Similarly to the UL grant information specified in the LTE, the implicitly indicated UL grant information may be a position of a radio resource of uplink data, presence/absence of frequency hopping, a modulation and coding scheme (MCS), a redundancy version (RV), a new data indicator (NDI), or the like or may be a portion of these pieces of the information (for example, only MCS and/or RV or the like). In addition, the information is not limited to the UL grant information specified in the LTE. But, the information may include information indicating a position of a unit resource with which data is to be transmitted (for example, data to be transmitted with a slot after two slots or the like). Therefore, since it is unnecessary to explicitly transmit the UL grant information from the base station 10 to the user apparatus UE, it is possible to further reduce the overhead of the control information.

In addition, as another method, the communication device $10_1$ (Base Station) may indicate, to the communication device $10_2$ (User Apparatus), the UL grant information in advance by using a control signal (for example, DCI), an RRC message or broadcast information which is to be used in a physical layer, and in the case where the communication device $10_2$ (User Apparatus) receives the RRS, the communication device $10_2$ (User Apparatus) may transmit the uplink data to the communication device $10_1$ (Base Station) according to the UL grant information indicated in advance. In other words, when the communication device $10_2$ (User Apparatus) performs data transmission in step S17 of FIG. 3, the communication device $10_2$ (User Apparatus) may perform the data transmission according to the UL grant information which is indicated by the communication device $10_1$ (Base Station) in advance.

The communication device $10_1$ (Base Station) may indicate the UL grant information in advance every time the RRS is transmitted. For example, this is preferable to a case where the frequency of performing data transmission from the communication device $10_2$ (User Apparatus) is low.

In addition, instead of indicating the UL grant information in advance every time the communication device $10_1$ (Base Station) transmits the RRS, the communication device $10_1$ may indicate the UL grant information, only in the case where the communication device $10_1$ changes the UL grant information indicated in advance. In addition, the communication device $10_1$ (Base Station) may be allowed to indicate, to the communication device $10_2$ (User Apparatus), a period during which the UL grant information indicated in advance is valid or the number of available times. The period during which the UL grant information indicated in advance is valid or the number of available times may be defined in advance by standard specifications or the like. In addition, the UL grant information to be applied in the case of receiving the RRS is defined in advance by standard specifications or the like, and thus, in a case where the UL grant information is not indicated in advance by the communication device $10_1$ (Base Station), the communication device $10_2$ (User Apparatus) may use the UL grant information defined in advance by the standard specifications or the like. Therefore, in a case where the frequency of updating of the UL grant information is low, it is unnecessary to transmit the UL grant information every time the RRS is transmitted, and thus, in comparison with a method of transmitting the UL grant information every time the RRS is transmitted, it is possible to reduce the overhead of the control information.

Supplementary Matters Relating to Embodiment

In the embodiment described above, the description is made on the basis of the situation that, in the state where the communication device $10_1$ and the communication device $10_2$ perform communication by using the transmission beam and the reception beam, respectively, in a case where the communication device $10_1$ has changed the reception beam on the basis of a predetermined selection logic, the communication device $10_2$ performs data transmission with a transmission beam appropriate for the changed reception beam.

However, the transmission method "reciprocity based transmission" performed by the communication device 10 is not limited to a case where the communication device 10 of the counterparty has changed the reception beam, but the transmission method may be applied to various scenarios. For example, in the state where the communication device $10_1$ forms an omni-cell (forms a cell without performing the beam-forming) and the communication device $10_2$ directs the transmission beam and the reception beam in different directions, in the case of determining the transmission beam of the communication device $10_1$, it is also possible to determining the direction of the transmission beam by using the transmission method "reciprocity based transmission". In addition, in a case where the communication device $10_1$ forms transmission beams including the CSI-RS in a plurality of directions and one of the transmission beams also serves as a reception beam, the communication device $10_2$ may determine the directions of the transmission beams by using the transmission method "reciprocity based transmission". In these scenarios, the communication device 10 may also perform the "reciprocity based transmission" by using any reference signal other than the specific reference signal (RRS).

Heretofore, the processing procedure performed by the wireless communication system according to the embodiment has been described. According to the embodiment, when the communication device 10 has changed the reception beam on the basis of the predetermined selection logic, the communication device 10 allows the communication device 10 of the counterparty to transmit data with a transmission beam appropriate for the changed reception beam. Thus, for example, in a case where the interference wave observed with the communication device 10 (Base Station) is larger than the interference wave observed with the communication device 10 (User Apparatus), the communication device 10 (Base Station) can perform an operation of changing the reception beam by its own determination and allowing the communication device 10 (User Apparatus) to change the transmission beam to a transmission beam appropriate for the changed reception beam and to perform data transmission, and thus, it is possible to improve the communication quality (throughput or the like).

In addition, in the embodiment, the communication device 10 changes the transmission beam by using the reversibility of the radio propagation path (channel). Therefore, for example, the communication device 10 determines the PMI corresponding to the reception beam that the communication device has changed on the basis of the reference signal transmitted from the communication device 10 of the counterparty and instructs the communication device 10 to reduce communication latency in comparison with the case of using a method with a large overhead (so-called precoding method based on a closed loop).

<Functional Configuration>

Figure 9:
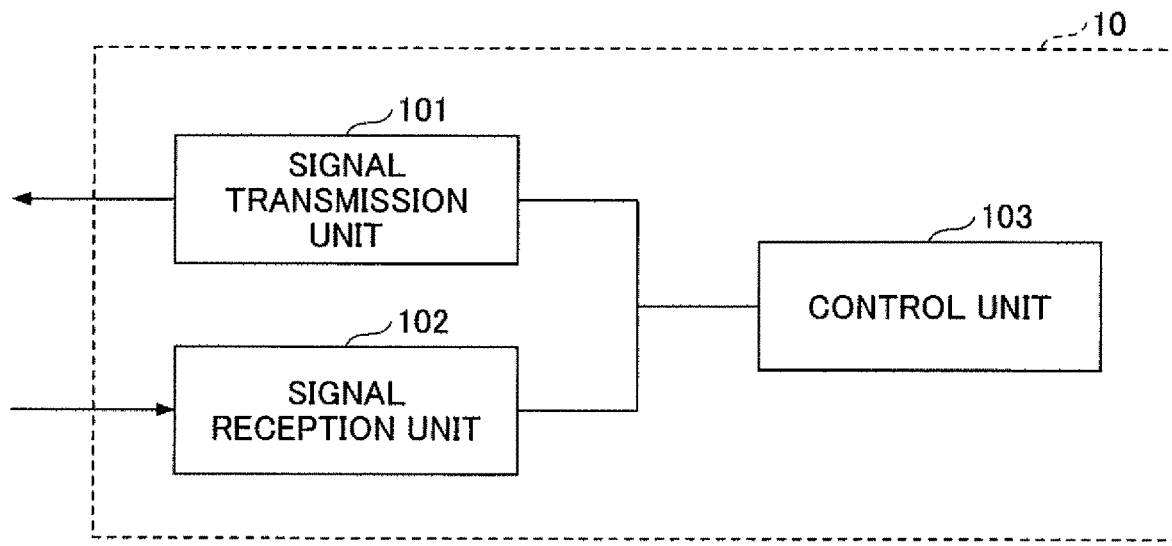
FIG. 9 is a diagram illustrating a functional configuration example of a communication device according to an embodiment.

FIG. 9 is a diagram illustrating a functional configuration example of the communication device according to the embodiment. As illustrated in FIG. 9, the communication device 10 is configured to include a signal transmission unit 101, a signal reception unit 102, and a control unit 103. In addition, FIG. 9 illustrates only the functional units particularly relating to the embodiment of the present invention in the communication device 10, and thus, functions (not illustrated) for performing operations in accordance with at least the LTE (including 5G) may also be included. In addition, the functional configuration illustrated in FIG. 9 is merely an example. As long as the operation according to the embodiment can be executed, any functional division and any names of functional units may be available. Hereinafter, the functional configurations of the communication device 10 will be described separately in the case of operating as the communication device $10_2$ and in the case of operating as the communication device $10_1$. However, the communication device 10 may have both functional configurations or may have only one of the functional configurations.

(Operating as Communication Device $10_1$)

The signal transmission unit 101 has a function of generating various types of signals of the physical layer from the signals of the higher layer to be transmitted from the communication device 10 and wirelessly transmitting the signals. In addition, the signal transmission unit 101 has a function of transmitting a radio signal (transmitting a precoded radio signal) by using a transmission beam according to an instruction of the control unit 103. In addition, in a case where a reception beam is changed by the signal reception unit 102, the signal transmission unit 101 has a function of transmitting a specific reference signal by using the changed reception beam. In addition, before transmitting the specific reference signal, the signal transmission unit 101 may transmit, to another communication device 10, the information indicating that the specific reference signal is to be transmitted.

The signal reception unit 102 has a function of wirelessly receiving various types of signals from a different communication device 10 and acquiring signals of higher layers from the received signals of the physical layer. In addition, the signal reception unit 102 has a function of receiving a radio signal by using a reception beam according to an instruction of the control unit 103 (multiplying a radio signal by a weighting vector and receiving the radio signal).

The control unit 103 has a function of controlling the transmission beam used by the signal transmission unit 101 at the time of transmitting the radio signal and the reception beam used by the signal reception unit 102 at the time of receiving the radio signal. More specifically, the control unit 103 has a function of determining the weighting vector used by the signal reception unit 102 and the precoding vector used by the signal transmission unit 101. In addition, the control unit 103 has a function of changing the reception beam used by the signal reception unit 102 at the time of receiving the radio signal on the basis of a predetermined trigger (for example, in the case of it is detected that an interference wave is increased).

(Operating as Communication Device 102)

The signal transmission unit 101 has a function of generating various types of signals of the physical layer from the signal of the higher layer to be transmitted from the communication device 10 and wirelessly transmitting the signals. In addition, the signal transmission unit 101 has a function of transmitting a radio signal (transmitting a precoded radio signal) by using a transmission beam according to an instruction of the control unit 103. In addition, in a case where a specific reference signal is in correspondence with information indicating a data transmission method, the signal transmission unit 101 may be allowed to transmit data to another communication device 10 according to the data transmission method which is in correspondence with the specific reference signal.

The signal reception unit 102 has a function of wirelessly receiving various types of signals from the other communication device 10 and acquiring signals of the higher layer from the received signals of the physical layer. In addition, the signal reception unit 102 has a function of receiving a radio signal by using a reception beam according to an instruction of the control unit 103 (multiplying a radio signal by a weighting vector and receiving the radio signal). In addition, the signal reception unit 102 may acquire, from the other communication device 10, information indicating that a specific reference signal is transmitted from the other communication device 10, and in the case of acquiring the information, the signal reception unit may receive the specific reference signal. The information indicating that the specific reference signal is transmitted from the other communication device 10 may be a control signal to be used in the physical layer, may be an RRC message, or may be broadcast information.

In addition, in a case where the specific reference signal is a specific predetermined reference signal among a plurality of precoded predetermined reference signals (for example, CSI-RSs, BRSs, or the like), the signal reception unit 102 may acquire, from the other communication device 10, information indicating the radio resource with which the specific precoded predetermined reference signal is transmitted and receive the specific precoded predetermined reference signal with the radio resource indicated by the information indicating the acquired radio resource.

The control unit 103 has a function of controlling the transmission beam used by the signal transmission unit 101 at the time of transmitting the radio signal and the reception beam used by the signal reception unit 102 at the time of receiving the radio signal. More specifically, the control unit 103 has a function of determining a weighting vector to be used in the signal reception unit 102 and the precoding vector to be used in the signal transmission unit 101. In addition, the control unit 103 has a function of determining a precoding vector to be used for signal transmission by performing channel estimation by using the received specific reference signal and indicating the determined precoding vector to the signal transmission unit 101 in a case where the specific reference signal is received by the signal reception unit 102.

<Hardware Configuration>

The block diagram (FIG. 9) used in the description of the above-described embodiment illustrates blocks of functional units. These functional blocks (constituent units) are realized by a freely-selected combination of hardware and/or software. In addition, means for implementing each functional block is not particularly limited. In other words, each functional block may be realized by one physically and/or logically combined device. Alternatively, two or more physically and/or logically separated devices may be directly and/or indirectly connected (for example, in a wired and/or wireless manner), and thus, each functional block may be realized by these plural devices.

Figure 10:
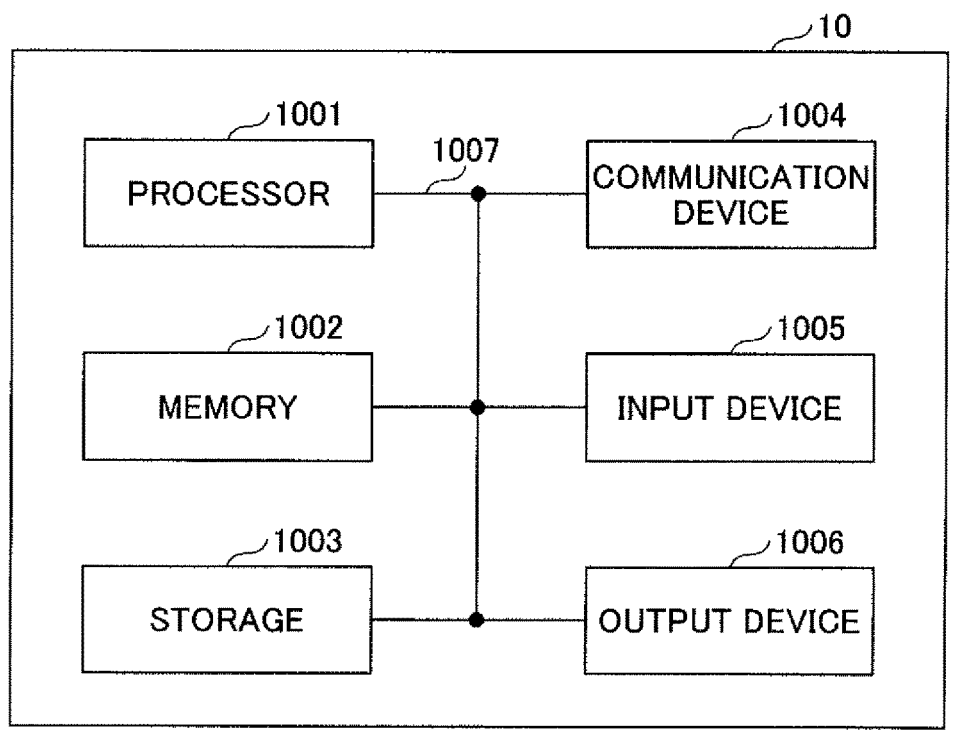
FIG. 10 is a diagram illustrating a hardware configuration example of a communication device according to an embodiment.

For example, the communication device 10 according to the embodiment of the present invention may function as a computer that performs processing of the communication method according to the present invention. FIG. 10 is a diagram illustrating a hardware configuration example of the communication device according to the embodiment. The above-described communication device 10 may be physically configured as a computer device including a processor 1001, a memory 1002, a storage 1003, a communication device 1004, an input device 1005, an output device 1006, a bus 1007, and the like.

In addition, in the following description, the term "device" can be replaced with a circuit, a device, a unit, or the like. The hardware configuration of the communication device 10 may be configured to include one or a plurality of devices illustrated in the drawings, or may be configured without including some devices.

Each function of the communication device 10 is realized: by allowing predetermined software (programs) to be loaded on hardware such as the processor 1001 and the memory 1002; and by allowing the processor 1001 to perform calculation, to perform controlling of communication by the communication device 1004, and to perform controlling of reading and/or writing of data in the memory 1002 and the storage 1003.

The processor 1001 operates, for example, the operating system to control the whole computer. The processor 1001 may be configured with a central processing unit (CPU) including an interface with a peripheral device, a control device, an arithmetic device, a register, and the like. For example, the signal transmission unit 101, the, signal reception unit 102, and the control unit 103 of the communication device 10 may be realized by the processor 1001.

In addition, the processor 1001 reads a program (program code), a software module, or data from the storage 1003 and/or the communication device 1004, stores them in the memory 1002, and executes various types of processing according to the program and the like. As the program, a program that allows a computer to execute at least a portion of the operation described in the above-described embodiment is used. For example, the signal transmission unit 101, the signal reception unit 102, and the control unit 103 of the communication device 10 may be realized by a control program that is stored in the memory 1002 and operates through the processor 1001, and other functional blocks may also be realized in the same manner. Although it has been described that the above-described various types of processing are executed by one processor 1001, it may be executed simultaneously or sequentially by two or more processors 1001. The processor 1001 may be implemented with one or more chips. In addition, the program may be transmitted from the network via an electric communication line.

The memory 1002 is a computer-readable recording medium and is configured with, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (main memory), or the like. The memory 1002 can store executable programs (program codes), software modules, and the like for implementing the communication method according to an embodiment of the present invention.

The storage 1003 is a computer-readable recording medium, and may be configured to include, for example, at least one of an optical disk such as a compact disc ROM (CD-ROM), a hard disk drive, a flexible disk, a magneto-optical disk (for example, a compact disk, a digital versatile disk, a Blu-ray (registered trademark) disk, or the like), a smart card, a flash memory (for example, a card, a stick, a key drive, or the like), a floppy (registered trademark) disk, a magnetic strip, and the like. The storage 1003 may be referred to as an auxiliary storage device. The above-described storage medium may be, for example, a database including the memory 1002 and/or the storage 1003, a server, or other appropriate medium.

The communication device 1004 is hardware (transmission/reception device) for performing communication between computers via a wired and/or wireless network and is also referred to as a network device, a network controller, a network card, a communication module, or the like. For example, the signal transmission unit 101 and the signal reception unit 102 of the communication device 10 may be realized by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. In addition, the input device 1005 and the output device 1006 may be configured to be integrated (for example, a touch panel).

In addition, the respective devices such as the processor 1001 and the memory 1002 are connected via a bus 1007 for communicating information. The bus 1007 may be configured as a single bus or may be configured as different buses between the devices.

In addition, the communication device 10 may be configured to include hardware such as a microprocessor, a digital signal processor (DSP), an application specific integrated circuit (ASIC), a programmable logic device (PLD), and a field programmable gate array (FPGA), and some or all of the functional blocks may be realized by the hardware. For example, the processor 1001 may be implemented with at least one of the above hardware.

<Summary>

As described above, according to the embodiment, there is provided a communication device communicating with a different communication device, including: a reception unit configured to receive a signal transmitted from the different communication device; a transmission unit configured to transmits a signal to the different communication device; and a control unit configured to decide a weighting vector to be used in the reception unit and a precoding vector to be used in the transmission unit, in which, in a case where a specific reference signal indicating that the weighting vector used for receiving the signal in the different communication device has been changed is received by the reception unit, the control unit decides the precoding vector to be used for signal transmission by performing channel estimation by using the received specific reference signal, and in which the transmission unit transmits data precoded with the precoding vector decided by the control unit. According to the communication device 10, there is provided a technique in a communication device performing communication by using a transmission beam and a reception beam, the technique capable of appropriately performing communication even in a case where the reception beam has been changed in the communication device on a reception side.

In addition, the specific reference signal may be precoded with a weighting vector which is used by the different communication device at the time of receiving a signal. Therefore, at the time of deciding the precoding vector to be used for signal transmission by using the reversibility of the channel, the communication device 10 can decide the precoding vector to be used for the signal transmission without acquiring the weighting vector used by the other communication device at the time of receiving the signal.

In addition, the reception unit may acquire, from the other communication device, information indicating that the specific reference signal is transmitted from the other communication device, and in a case where the reception unit has acquired the information, the reception unit may receive the specific reference signal. Therefore, in a case where the communication device 10 does not receive the information, since there is no need to receive the specific reference signal, it is possible to reduce power consumption.

In addition, the specific reference signal may be a specific predetermined reference signal among a plurality of precoded predetermined reference signals, and the reception unit may acquire, from the other communication device, information indicating a radio resource with which the specific precoded predetermined reference signal is transmitted and receive the specific precoded predetermined reference signal with the radio resource indicated by the acquired information indicating the radio resource. Therefore, the wireless communication system can use the predetermined reference signal as a specific reference signal.

In addition, the specific reference signal may be in correspondence with information indicating a data transmission method, and the transmission unit may transmit data to the other communication device according to the data transmission method which is in correspondence with the specific reference signal received by the reception unit. Therefore, the communication device 10 that transmits the UL grant can transmit, to the other communication devices 10, all or a portion of the UL grant in correspondence with the specific reference signal, and thus, it is possible to reduce a signaling amount.

In addition, according to an embodiment, there is provided a communication method executed by a communication device communicating with another communication device, including: receiving a signal transmitted from the other communication device by a reception unit; transmitting a signal from a transmission unit to the other communication device; determining a weighting vector to be used in the reception unit and a precoding vector to be used in the transmission unit; and in a case where a specific reference signal indicating that the weighting vector used for receiving the signal in the other communication device has been changed is received by the reception unit, determining the precoding vector to be used for signal transmission by performing channel estimation by using the received specific reference signal and transmitting data precoded with the determined precoding vector. According to the communication method, there is provided a technique in a communication device performing communication by using a transmission beam and a reception beam, the technique capable of appropriately performing communication even in a case where the reception beam has been changed in the communication device on a reception side.

Supplement to Embodiments

Each aspect/embodiment described in the specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

In addition, processing procedures, sequences, flowcharts, and the like of each embodiment described in the specification may be exchanged as long as there is no inconsistency. For example, for the methods described in the specification and the claims, the elements of the various steps are presented in an exemplary order and are not limited to a specific order presented.

Input/output information or the like may be stored in a specific site (for example, a memory) or may be managed in a management table. The input/output Information or the like may be overwritten, updated, or additionally written. The output information or the like may be deleted. The input information or the like may be transmitted to another device.

Notification (Indication/Transmission) of predetermined information (for example, notification of "being X") is not limited to being performed explicitly, but the notification may be performed implicitly (for example, not notifying (indicating/transmitting) the predetermined information).

The information, signals, or the like described in the specification may be represented by using any of different technologies. For example, data, instructions, commands, information, signals, bits, symbols, chips, or the like mentioned over the above description may be represented by voltages, currents, electromagnetic waves, magnetic fields or particles, optical fields or photons, or any combination thereof.

The terms "system" and "network" as used in the specification may be used interchangeably.

In some cases, a the user apparatus UE may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term by the skilled in the art.

In some cases, the base station may be referred to as a fixed station, a Node B, an eNode B (eNB), an access point, a femto cell, a small cell, or the like.

The reference signal may be abbreviated to an RS and may be referred to as a pilot in accordance with applied standards. In this sense, the "specific reference signal" in the embodiment may be referred to as a "specific pilot signal".

In some cases, the terms "determining" and "deciding" used in the specification may include a wide variety of operations. The "determining" or the "deciding" may include something regarded as "determining" or "deciding" of, for example, judging, calculating, computing, processing, deriving, investigating, looking up (for example, looking up in a table, a database, or other data structures), or ascertaining. In addition, the "determining" or the "deciding" may include something regarded as "determining" or "deciding" of receiving (for example, receiving information), transmitting (for example, transmitting information), input, output, or accessing (for example, accessing data in memory). In addition, the "determining" or the "deciding" may include something regarded as "determining" or "deciding" of resolving, selecting, choosing, establishing, comparing, or the like. In other words, the "determining" or the "deciding" may include something regarded as "determining" or "deciding" of some operation.

The phrase "on the basis of" used in the specification does not denote "on the basis of only" unless explicitly stated otherwise. In other words, the phrase "on the basis of" denotes both "on the basis of only" and "on the basis of at least".

As long as the terms "include", "including", and variations thereof are used in the specification or claims, these terms are intended to be inclusive similarly to the term "comprising". In addition, the term "or" used in the specification or claims is intended not to be an exclusive OR.

The radio frame may be configured to include one frame or a plurality of frames in the time domain. In the time domain, the one frame or each of the frames may be referred to as a subframe. The subframe may be further configured to include one slot or a plurality of slots in the time domain. The slot may be further configured to include one symbol or a plurality of symbols (OFDM symbol, SC-FDMA symbol, and the like) in the time domain. The radio frame, subframe, slot, and symbol represent time units for transmitting a signal. The radio frame, the subframe, the slot, and the symbol may be differently referred to. The minimum time unit of scheduling may be referred to as a TTI. For example, one subframe may be referred to as a TTI, or a plurality of consecutive subframes may be referred to as a TTI, or one slot may be referred to as a TTI.

In the entire disclosure, for example, in a case where articles such as a, an, and the in English are added by translation, unless otherwise disclosed obviously from the context, the articles are intended to include plural ones.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

Although the present invention has been described above in detail, it will be apparent to the skilled in the art that the present invention is not limited to the embodiments described herein. The present invention can be implemented as changes and modifications without departing from the spirit and scope of the present invention as defined by the scope of the claims. Accordingly, the description of the specification is provided for the purpose of illustration and description and does not have any restrictive meaning with respect to the present invention.

The present application is based on and claims priority to Japanese patent application No. 2016-192356 filed on Sep. 29, 2016, the entire contents of which are hereby incorporated by reference.

EXPLANATIONS OF LETTERS OR NUMERALS 10 communication device
101 signal transmission unit
102 signal reception unit
103 control unit
1001 processor
1002 memory
1003 storage
1004 communication device
1005 input device
1006 output device

The invention claimed is:

1. A communication device communicating with another communication device, comprising:
a receiver that receives a signal transmitted from the another communication device;
a transmitter that transmits a signal to the another communication device; and
a processor that determines a weighting vector to be used in the receiver and a precoding vector to be used in the transmitter,
wherein, in a case where a specific reference signal indicating that the weighting vector used for receiving the signal in the another communication device has been changed is received by the receiver, the processor determines the precoding vector to be used for signal transmission by performing channel estimation by using the received specific reference signal, and
wherein the transmitter transmits data precoded with the precoding vector determined by the processor.

2. The communication device according to claim 1, wherein the specific reference signal is precoded with the weighting vector which is used by the another communication device at a time of receiving the signal.

3. The communication device according to claim 1, wherein the receiver acquires, from the another communication device, information indicating that the specific reference signal is transmitted from the another communication device, and in a case where the receiver has acquired the information, the receiver receives the specific reference signal.

4. The communication device according to claim 1,
wherein the specific reference signal is a specific predetermined reference signal among a plurality of precoded predetermined reference signals, and
wherein the receiver acquires, from the another communication device, information indicating a radio resource with which the specific precoded predetermined reference signal is transmitted and receives the specific precoded predetermined reference signal with the radio resource indicated by the acquired information indicating the radio resource.

5. The communication device according to claim 1,
wherein the specific reference signal is in correspondence with information indicating a data transmission method, and
wherein the transmitter transmits data to the another communication device according to the data transmission method which is in correspondence with the specific reference signal received by the receiver.

6. A communication method executed by a communication device communicating with another communication device, comprising:
receiving a signal transmitted from the another communication device by a receiver;
transmitting a signal from a transmitter to the another communication device;
determining a weighting vector to be used in the receiver and a precoding vector to be used in the transmitter; and
in a case where a specific reference signal indicating that the weighting vector used for receiving the signal in the another communication device has been changed is received by the receiver, determining the precoding vector to be used for signal transmission by performing channel estimation by using the received specific reference signal and transmitting data precoded with the determined precoding vector.

7. The communication device according to claim 2, wherein the receiver acquires, from the another communication device, information indicating that the specific reference signal is transmitted from the another communication device, and in a case where the receiver has acquired the information, the receiver receives the specific reference signal.

8. The communication device according to claim 2, wherein the specific reference signal is a specific predetermined reference signal among a plurality of precoded predetermined reference signals, and wherein the receiver acquires, from the another communication device, information indicating a radio resource with which the specific precoded predetermined reference signal is transmitted and receives the specific precoded predetermined reference signal with the radio resource indicated by the acquired information indicating the radio resource.

9. The communication device according to claim 3, wherein the specific reference signal is a specific predetermined reference signal among a plurality of precoded predetermined reference signals, and wherein the receiver acquires, from the another communication device, information indicating a radio resource with which the specific precoded predetermined reference signal is transmitted and receives the specific precoded predetermined reference signal with the radio resource indicated by the acquired information indicating the radio resource.

10. The communication device according to claim 2, wherein the specific reference signal is in correspondence with information indicating a data transmission method, and wherein the transmitter transmits data to the another communication device according to the data transmission method which is in correspondence with the specific reference signal received by the receiver.

11. The communication device according to claim 3, wherein the specific reference signal is in correspondence with information indicating a data transmission method, and wherein the transmitter transmits data to the another communication device according to the data transmission method which is in correspondence with the specific reference signal received by the receiver.

12. The communication device according to claim 4, wherein the specific reference signal is in correspondence with information indicating a data transmission method, and wherein the transmitter transmits data to the another communication device according to the data transmission method which is in correspondence with the specific reference signal received by the receiver.

\* \* \* \* \*